July 2, 1957     C. R. ECKHART     2,797,774

WHEEL CHOCK

Filed Oct. 2, 1952

INVENTOR.
C. R. ECKHART

BY

ATT'Y.

United States Patent Office 2,797,774
Patented July 2, 1957

2,797,774
WHEEL CHOCK

Charles Richard Eckhart, Dayton, Ohio, assignor to The Dayton Rubber Company, a corporation of Ohio Application October 2, 1952, Serial No. 312,711

2 Claims. (Cl. 188—32)

This invention relates to wheel chocks of the type adapted to resist forward motion of a wheel along a planar surface.

Chocks of this variety are used in connection with passenger cars, trucks, and airplanes whenever it is desired to prevent the same from rolling along a highway, down a hill, along a runway or over similar supporting surfaces. Particularly with regard to trucks and passenger cars, wheel chocks fall within the classification of emergency equipment which is used or needed under extraordinary circumstances such as motor or brake failure, forced stopping on inclines, and the like. Accordingly, there may be long periods of time elapsing from one use of the chock to another. This intermittent usage notwithstanding, the wheel chocks must be carried at all times in the vehicles with which they are to be used in order that they will be on hand when the extraordinary circumstances requiring their use arise. The problem thus encountered of storage for long periods of time in damp or crowded trunks, tool compartments, and the like requires that a satisfactory wheel chock be corrosion resistant as well as sufficiently durable to withstand the jostling of wheel jacks, tire chains, smudge pots, and the like, with which it is likely to be stored. The wheel chock must, of course, have sufficient rigidity and compressive strength to resist the forces of potential forward motion of a wheel. In order that these properties may be utilized effectively, it is also necessary that the ground contacting surface of the chock have a high coefficient of friction so that the chock will maintain wedging engagement with a wheel and its supporting surface. Since it is often desirable to equip a vehicle with four such chocks, the same should be relatively light in weight and inexpensive.

Wheel chocks which are preesntly in use have been made principally of metal or of wood. While the metal may offer the reqired rigidity and compressive strength, it offers little resistance to corrosion and when chocks constructed of the same are stored in such space as may be available in a vehicle, this corrosion causes serious deterioration of the chocks even though they are not being used. Since manufacturing solid block-type chocks of metal would be too expensive and would result in excessive weight, the metal chocks are made of separate structural members any of which may be critically weakened by very little corrosion and thereby weaken the whole. In addition to their lack of corrosion resistance, metallic wheel chocks offer little friction resistance to sliding so that other frictioning elements must be employed, thus increasing the cost of the chock and providing additional sources of wear.

Wooden chocks, while possessing certain corrosion-resistant properties, provide wheel and ground contacting surfaces that have low coefficients of friction. Wooden chocks are also subject to warping, cracking, and splitting when they are stored in damp or crowded storage spaces in which they will be jostled about, and are for this reason unsatisfactory for use with land vehicles.

It is an object of this invention to provide a satisfactory wheel chock adapted to wedge between a wheel and the surface upon which it rests to prevent movement of the wheel.

It is another object of this invention to provide such a wheel chock which is weather and corrosion resistant and sufficiently durable to withstand being stored in vehicular storage compartments.

It is a further object of this invention to provide a wheel chock, the material of which will have a high compressive strength, high modulus of elasticity and a high coefficient of friction.

It is a still further object of this invention to provide a wheel chock which will be sufficiently deformable to allow its firm engagement with a wheel and its supporting surface.

It is yet another object of this invention to provide such a wheel chock that is easily and inexpensively constructed.

To achieve these and other desired objects and advantages of my invention which will be made apparent to one reading the present disclosure, I propose to form the entire wheel chock from a mass of rubber or rubber-like composition loaded with textile fibers or similar natural or synthetic reinforcing fillers. This material, so reinforced, will possess the desired corrosion resistance, compressive strength, durability, deformability, and friction resistance above-mentioned. I further propose a design for the wheel chock of this invention comprising a ground contacting base portion and an upwardly concave inclined wheel contacting surface. The ground contacting base portion is provided with spaced transverse cleats or ribs formed between a plurality of transverse grooves. These cleats have downwardly converging faces so that a downward force exerted on the chock will tend to force the cleats into the ground or other wheel supporting surface thereby locking the chock and the wheel in a fixed position. While these cleats may or may not extend entirely across the base portion of the chock, they should be provided throughout the length of the base portion so that, regardless of varying conditions of wheel load upon the chock, the resultant of the forces exerted by the wheel will act upon a cleated portion of the base. A chock thus designed will always utilize the maximum force available in urging the cleated base into the wheel supporting surface.

The features of the utility and construction of this chock of my invention will be more fully understood from the following detailed description in connection with the appended drawings.

Figure 1:
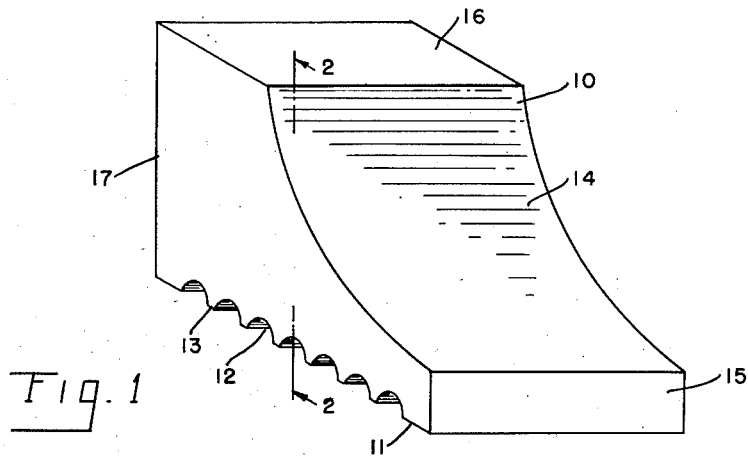
Figure 1 is a perspective view of a typical wheel chock of this invention.

As shown in Figure 1, a typical wheel chock 10 of this invention comprises a ground contacting surface 11 which is provided with longitudinally spaced lateral grooves 12 forming laterally disposed ribs 13 which may or may not extend entirely across the surface 11. The ribs 13 may be formed by semi-circular grooves 12 as shown in Figure 1, or by triangular grooves such as 26 in Figure 3. The purpose of the ribs is to provide for a firm engagement of the base or ground contacting surface 11 with irregular wheel supporting surfaces such as are encountered on highways, shoulders, dirt roads, and the like. Where the wheel supporting surface is soft, these serrations will act as cleats by sinking into such surface thereby maintaining the fixed position of the chock relative to the surface on which it rests.

The wheel engaging portion of the chock 10 is the inclined concave surface 14 which extends upwardly from the toe or leading edge 15 to the top surface 16. The wheel engaging surface 14 is concaved to conform generally to the size of the wheel with which it is to be used; but in view of the deformability of the chock of this invention and of the pneumatic tire with which it is to be used, broad tolerances on the curvature of the surface 14 are allowable. Experience has shown that a single pattern may be used for chocks on all conventional passenger car and truck tires, although a separate pattern for each of these vehicular classifications is desirable. For use with wheels larger or smaller than those on trucks and passenger cars, the radius of curvature of the wheel contacting surface should be altered proportionately. This wheel engaging surface 14 may be made concave laterally as well as vertically so as to embrace a wheel more completely, but this is not necessary in view of the fact that the pressure of a wheel bearing against this deformable chock will cause the surface 14 to become laterally concave.

The leading edge 15 should be low enough and the inclination of the surface 14 should be gradual enough to allow a wheel to roll partially upon the chock so that the force exerted by the wheel will have a downward component capable of assisting the friction lock between the base 11 and the ground, highway, or other supporting surface. At the same time, that part of the chock lying below the top surface 16 should be sufficiently large and rigid to resist the forward acting components of the force exerted by the wheel.

Since the conditions of wheel load upon the chock will vary, the latter must be designed to accommodate a variety of stress patterns. Under any given set of load conditions, the resultant of all of the forces exerted upon the chock by the wheel should pass through or in front of the line at which the back surface 17 meets the ground so that the chock will not topple. Control of the incidence of this resultant force is effected by altering the length of the base 11 and the inclination angle of the concave surface 14. The height of the block should be such that more than half of the forward acting component of the force exerted by the wheel is resisted by the chock.

By way of a specific example, I have constructed a type of chock according to the above principles which is adapted for use in conjunction with the conventional passenger car tires. The base portion corresponding to 11 of Figure 1 is 6 in. long and 4 in. wide. Beginning 1 in. back from the leading edge 15 said base portion is provided with laterally extending semi-circular grooves measuring ¼ in. in diameter and separated by ¼ in. teeth. The wheel contacting surface 14 begins ⅜ in. up from the bottom of the toe 15 and is upwardly concaved at a radius of substantially 10¾ in. to intersect the top surface 16 approximately ¾ in. in front of the rear surface 17 which measures 4 in. by 4 in.

Figure 2:
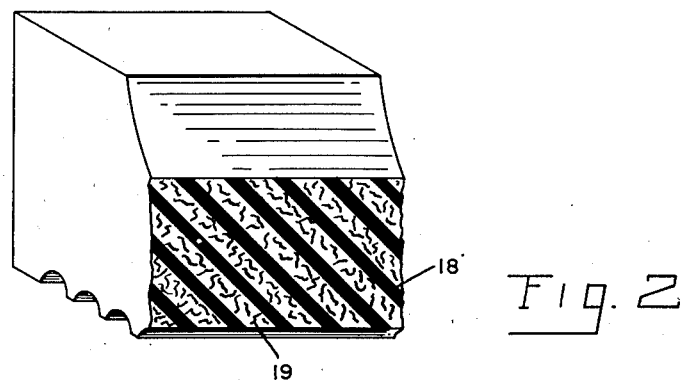
Figure 2 is a vertical section on line 2—2 through the wheel chock of Figure 1 showing the nature of the material from which the wheel chocks of this invention are constructed.

As best shown by Figure 2, the material used in the manufacture of these chocks consists of rubber 18 and small textile fibers 19 intermingled therewith. In lieu of rubber, any of the well-known synthetic rubber-like compounds may be used. A typical composition to be used in the manufacture of a chock similar to that described above might consist of the following parts by weight:

| | Parts by weight |
|---|---|
| Crude rubber | 100 |
| Zinc oxide | 5 |
| Sulfur | 2.75 |
| Accelerator | 1 |
| Softener | 7.25 |
| Carbon black | 35 |
| Antioxidant | 1.5 |
| Stearic acid | 1.25 |
| Rayon synthetic or cotton fibers | 50 |

In this composition, the material without the fibers is relatively soft; but with the addition of fiber, the elastic modulus is considerably increased. Depending upon the characteristic of the rubber material employed, from 10 to 100 parts by weight of natural or synthetic fiber to 100 parts of rubber-like material may be used to provide a Shore durometer hardness of from 70 to 90. It has been found that uniform reinforcement and ease in handling the material will result from the use of fibers ranging in length from ⅛ in. to 1 in.

Such rubber or rubber-like material will have the desired resistance to corrosion, abrasion, and shock and will therefore be adapted to storage in vehicular tool compartments and the like. The addition of the textile fibers and/or reinforcing resinous fillers will provide the necessary rigidity and elastic modulus to equip the chock to handle the loads to which it will be subjected. At the same time, the use of textile fibers will not alter the corrosion resistant properties of the chock and their addition will normally reduce the cost of manufacturing and the weight of the completed article. There are many types of scrap rubber, such as tire and belt scrap, which are adaptable to the requisites of the chock of this invention and already contain the necessary fiber. The application of such material to the chock of this invention may be made without any additions of material, and, at the same time, provides a use for such fiber loaded scrap which might otherwise have no salvage value.

Figure 3:
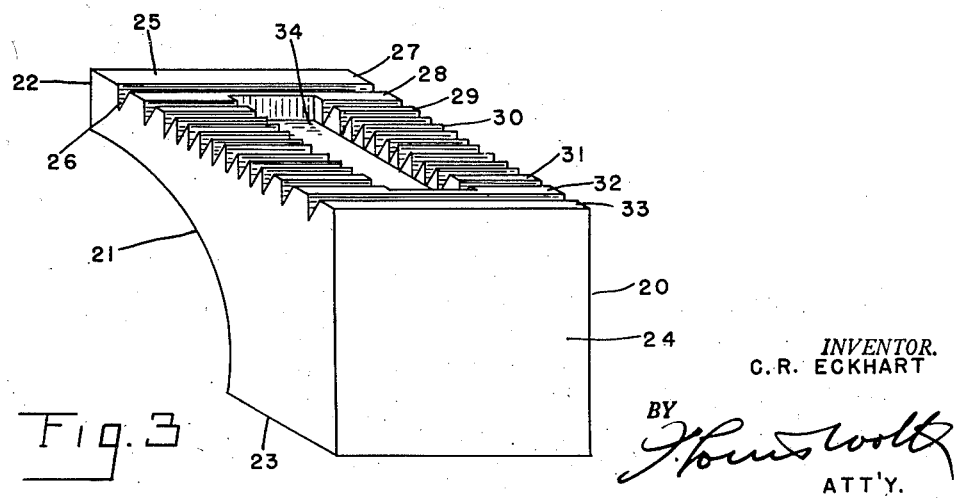
Figure 3 is a perspective view of an alternative wheel chock according to this invention, the same being shown in inverted position.

Referring now to Figure 3, there is shown an inverted chock 20 which constitutes a variation of the present invention. This chock is constructed of the same fiber loaded rubber or rubber-like composition as the previously described embodiment and has a similar concave wheel contacting surface 21, toe or leading edge 22, top 23, and back 24. For use with a passenger car this modification may have the same overall dimensions as the chock set forth above. It will be observed, however, that the ground contacting surface 25 is so divided by transverse grooves 26 as to form lugs or cleats of various sizes and shapes. Lugs 27, 28, 32, and 33 nearest the front and rear of the chock are trapezoidal in cross section and extend over the entire width of the base. The lugs 29 and 31 nearer the center are likewise of trapezoidal cross section but are narrower than the end ribs and are broken near center of the block to form recess 34. The cleats 30 at the center of the base are triangular in cross section and are similarly broken to form the recess 34.

The effect of the recess 34 centered in the base of the chock and of the closely spaced serrations forming narrow triangular teeth 30 midway between the ends of the base is to cause the center of the block to be more deformable than the outer edges thereof. As a result of this deformability, a wheel resting against the concave surface 21 will sink into the chock increasing the area of contact between wheel and chock thereby decreasing the unit stress of the wheel load on the block. At the same time the weight of a wheel on a chock according to that shown in Figure 3 will cause the resilient triangular teeth to heel and to thus create a wiping action which will resist any movement of the chock relative to its supporting surface in the direction of the force of the wheel. The separate features of this modification of my invention may be individually employed or combined in different ways depending upon the proposed use of the chock. For example, where the chock of this invention will be used on relatively small and light weight vehicles, its entire base may be provided with the triangular ribs 30 to obtain the maximum locking effect from the above-mentioned wiping action. The reduction in width and spacing of the ribs may be progressively greater from each end of the chock toward the center.

The chock of this invention may be manufactured according to a variety of molding and extruding techniques. I have found, however, that where a compound containing more than 20% fiber is employed, the material is not adaptable to extrusion or injection molding. In forming a wheel chock according to this invention from the previously described compound containing approximately 40% rayon fiber by weight, for example, I took the stock from the mill in sheets ranging from 3/16 in. to 1/2 in. in thickness and cut these sheets to the proper size for lamination in a heat and pressure mold suitable for vulcanization. If it is desired to form the chocks from scrap tire or belt stock as mentioned above, such scrap may be "cracked" before milling and following the above-outlined procedure, or it may simply be broken into small pieces for packing directly into a compression mold prior to application of vulcanizing heat and pressure.

Having thus described this invention by reference to specific examples thereof, I shall particularly define the same in the subjoined claims.

I claim:

1. A wheel chock composed of a fiber reinforced rubber composition having an inclined upwardly concave wheel-contacting surface, and a substantially planar ground-contacting surface, said ground-contacting surface comprising a plurality of transversely extending ribs throughout its length, a majority of said ribs being of flexible, resilient, triangular, cross-sectional configuration, and at least one of said ribs at the front and rear portions being of a rigid, pressure resistant, trapezoidal, cross-sectional configuration, said ribs defining a centrally disposed recess in said ground-contacting surface, all of said ribs and said recess cooperating to create a ground-gripping surface under conditions of pressure upon said wheel-contacting surface.

2. A wheel chock according to claim 1 in which said ribs have a spacing which progressively decreases from the ends toward the center.

References Cited in the file of this patent

UNITED STATES PATENTS

| | | |
|---|---|---|
| 838,830 | Williams | Dec. 18, 1906 |
| 1,082,807 | Holworthy | Dec. 30, 1913 |
| 1,123,718 | Fischer | Jan. 5, 1915 |
| 1,694,316 | Evans | Dec. 4, 1928 |
| 1,893,580 | Colley | Jan. 10, 1933 |
| 2,013,553 | Day | Sept. 3, 1935 |
| 2,143,553 | Hamaguchi | Jan. 10, 1939 |
| 2,297,204 | Deissner | Sept. 29, 1942 |
| 2,344,148 | Jackson | Mar. 14, 1944 |
| 2,631,463 | Waugh | Mar. 17, 1953 |

FOREIGN PATENTS

| | | |
|---|---|---|
| 205,322 | Great Britain | Oct. 18, 1923 |
| 286,002 | Great Britain | Feb. 27, 1928 |